(12) United States Patent
Myhre et al.

(10) Patent No.: US 7,504,141 B2
(45) Date of Patent: Mar. 17, 2009

(54) SHRINK FILM

(75) Inventors: Ole Jan Myhre, Stathelle (NO); Merete Skar, Stathelle (NO); Hans Georg Daviknes, Stathelle (NO); Kjetil Larsen Brove, Stathelle (NO); Geir Morten Johansen, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 427 days.

(21) Appl. No.: 10/523,359

(22) PCT Filed: Jul. 29, 2003

(86) PCT No.: PCT/GB03/03217

§ 371 (c)(1),
(2), (4) Date: Jun. 13, 2005

(87) PCT Pub. No.: WO2004/011517

PCT Pub. Date: Feb. 5, 2004

(65) Prior Publication Data

US 2005/0271868 A1 Dec. 8, 2005

(30) Foreign Application Priority Data

Jul. 29, 2002 (GB) .................. 0217520.6

(51) Int. Cl.
*B65B 53/00* (2006.01)
*B65B 53/02* (2006.01)
*C08F 210/00* (2006.01)
*C08F 210/02* (2006.01)

(52) U.S. Cl. .............. 428/34.9; 428/34.1; 428/34.2; 428/35.7; 428/35.9; 526/65; 526/66; 526/157; 526/158; 526/191; 526/348; 526/348.2; 526/348.3; 526/348.5; 526/348.6; 526/352; 525/88; 525/89; 525/95; 525/240

(58) Field of Classification Search ............... 428/34.1, 428/34.2, 35.7, 35.9, 34.9, 65, 66, 157; 526/158, 526/191, 348, 348.2, 348.3, 348.5, 348.6, 526/352; 525/88, 89, 95, 240

See application file for complete search history.

(56) References Cited

U.S. PATENT DOCUMENTS

| | | | |
|---|---|---|---|
| 4,814,135 A | 3/1989 | Heitz | 264/564 |
| 5,112,696 A | 5/1992 | Roberts | 428/516 |
| 5,539,076 A | 7/1996 | Nowlin et al. | 526/348.1 |
| 5,736,258 A | 4/1998 | Moy | 428/523 |
| 5,759,675 A | 6/1998 | Hamada et al. | 428/213 |
| 6,147,167 A | 11/2000 | Mack et al. | 525/333.8 |
| 6,605,675 B2 * | 8/2003 | Mawson et al. | 526/115 |
| 6,632,884 B1 * | 10/2003 | Skar et al. | 525/191 |

FOREIGN PATENT DOCUMENTS

| | | |
|---|---|---|
| EP | A-443374 | 8/1991 |
| EP | 0773257 | 5/1997 |
| WO | WO92/12182 | 7/1992 |
| WO | WO99/41310 | 8/1999 |
| WO | WO02/02323 | 1/2002 |

* cited by examiner

Primary Examiner—Marc A Patterson
(74) Attorney, Agent, or Firm—Ballard Spahr Andrews & Ingersoll, LLP

(57) ABSTRACT

A shrink film comprising a polyethylene film, characterized in that said polyethylene is an ethylene copolymer mixture having a molecular weight distribution in the range 10 to 35, a density of 915 to 940 kg/m$^3$, a weight average molecular weight of at least 100000 D and an MFR$_{2.16}$ (190° C.) of 0.1 to 0.9 kg/m$^3$, which copolymer mixture is produced by a two or more stage copolymerization of ethylene and 2 to 10% mole (relative to ethylene) of a C$_{3-12}$ alpha-olefin comonomer in a series of reactors including at least one slurry loop reactor and at least one gas phase reactor using a heterogeneous Ziegler-Natta catalyst.

15 Claims, No Drawings

SHRINK FILM

CROSS REFERENCE TO RELATED APPLICATIONS

The present application claims priority to Great Brittan Patient Application No. 0217520.6, filed Jul. 29, 2002 which application is incorporated herein fully by this reference.

This invention relates to polyethylene shrink films and to processes for their preparation and their uses as packaging materials.

Shrink films are polymer films which on application of heat shrink in one or both directions. They are widely used as packaging and casing materials for both large and small products (e.g. industrial pallets, bottles, magazines, etc), generally with thicker films being used for larger items and thinner films for smaller items.

At present, the most widely used material for shrink film production is low density polyethylene (LDPE), optionally blended with other polymers to achieve a desired balance of properties (e.g. stiffness) and cost. LDPE shrink films may also include a coextruded polypropylene layer to reduce the incidence of fusion of the LDPE layer to shrink film wrapped objects during the heat treatment to shrink the film. These commonly used LDPE or LDPE-rich shrink films however suffer from various problems. In particular the shrink film has insufficient mechanical strength for many end uses, the occurrence of hole formation during the shrinking process is undesirably high, and the holding force of the shrink film is undesirably low.

Recently, it has been proposed in U.S. Pat. No. 5,736,258 (Union Carbide) to produce shrink film using a blend of copolymers of ethylene and $C_{3-12}$ alpha-olefins with a molecular weight distribution of at least 8, a density of 910 to 940 kg/m$^3$, and a weight average molecular weight of 90000 to 225000D. The ethylene copolymers used by U.S. Pat. No. 5,736,258 were produced by two stage Ziegler-Natta catalyst catalysed polymerization of ethylene and butene and of ethylene and hexene in two gas phase reactors and the resultant shrink films showed a shrinkage at 135° C. of at least 60% in the machine direction. These films however do not appear to be improved in terms of mechanical or shrinkage properties relative to the conventional LDPE films.

Shrink film is produced by extrusion through an annular die with a pressure difference applied to blow the extruded cylinder into a film and achieve the desired orientation within the film, i.e. to build a stress into the cooled film. Heat treatment results in stress relaxation and, as a result, shrinkage. Most of the shrinkage occurs while the film is at its hottest (generally ca. 120-130° C.) during the heat treatment; however the film continues to shrink as it cools. These are referred to as the hot shrink and the cold shrink respectively and for a polymer to function adequately as the base material for a shrink film it must meet the different requirements (in terms of melt strength, cold strength and other mechanical properties) of the hot shrink, cold shrink and post-shrinkage stages.

We have now found that these requirements are particularly well met by linear low density polyethylenes (LLDPE) having a high molecular weight distribution (MWD) and containing a mixture of ethylene copolymers prepared by a two or more stage Ziegler-Natta catalyst catalysed polymerization involving a combination of loop and gas phase reactors. (The term MWD refers to the ratio (Mw/Mn) between the weight average molecular weight (Mw) and the number average molecular weight (Mn) of a polymer).

Thus viewed from one aspect the invention provides a shrink film comprising a polyethylene film, characterized in that said polyethylene is an ethylene copolymer mixture having a molecular weight distribution in the range 10 to 35, preferably 15 to 25, a density of 915 to 940 kg/m$^3$, a weight average molecular weight of at least 100000 D, more preferably 150 to 300 kD, and especially 180 to 250 kD, and an $MFR_{2.16}$ (190° C.) of 0.1 to 0.9 kg/m$^3$, which copolymer mixture is produced by a two or more stage copolymerization of ethylene and 2 to 10% mole (relative to ethylene), especially 4 to 8% mole of a $C_{3-12}$ alpha-olefin comonomer in a series of reactors including at least one slurry loop reactor and at least one gas phase reactor using a heterogeneous Ziegler-Natta catalyst.

In the shrink film of the invention, one copolymer component preferably has a higher density and lower weight average molecular weight than the other copolymer component. The higher density of the lower molecular weight component is thought to result in a more rapid crystallization of this component during the shrinking process leading to more effective tie formation in the film and to improved mechanical properties. Generally, the density of the higher density copolymer component should be in the range 945 to 980 kg/m$^3$.

The shrink film of the invention may if desired be a multilayer film, e.g. incorporating a polypropylene protective layer as mentioned above, and the copolymer mixture layer may include other components besides the copolymer mixture, e.g. coloring agents, other polymers, etc. Generally however such other components will make up no more than 40% wt, more preferably no more than 25% wt, and especially no more than 10% wt of the copolymer mixture layer. However especially preferably the copolymer mixture layer contains no more than 5% wt of any further polymer.

In the shrink films of the invention the thickness of the copolymer mixture layer (i.e the thickness in the non-shrunk film) is preferably 20 to 500 μm more preferably 25 to 200 μm, e.g. 100 μm to 200 μm still more preferably 30 to 120 μm.

The thinner films of the invention (e.g. <70 μm thickness) are particularly suitable for wrapping relatively small loads, e.g. having a weight per package of 50 kg or less, more preferably 10 kg or less.

Examples of such loads include magazines, books, bottles, sets of bottles (e.g. with 2 to 12 in a set), etc. The thicker films, eg >100 μm thickness, are especially suitable for shrink wrapping large loads, e.g. of 500 kg or more.

The shrink films of the invention have particularly good properties not just in terms of their performance during the film shrinking operation but also in terms of the mechanical properties of the shrunk film itself. Thus the shrink film has a particularly beneficial combination of very low hot shrink force and very high cold shrink force. The low hot shrink force serves to reduce hole formation during the shrinking operation (a major problem with conventional shrink films) while the high cold shrink forces provide excellent holding properties, i.e. they serve to stabilize the shrink-wrapped product. Moreover the shrunk film has mechanical properties (e.g. dart drop, and tensile strength) which are improved relative to conventional shrink films, especially at very low temperatures. As a result the shrink films of the invention are especially suited for use in packaging products which will be exposed to low temperatures during transportation or storage. This combination of properties relevant to shrink wrapping is both unexpected and highly advantageous.

The MWD of the copolymer mixture is a central parameter in achieving the desired properties of the shrink film. The required MWD of 10 to 35 indicates a broad range of molecular weights for the copolymer mixture. Preferably the MWD is in the range 13 to 25, especially 15 to 23. The high MWD is achieved by the use of both slurry loop and gas phase polymerization reactors, preferably in the sequence loop reactor then gas phase reactor, e.g. as described in WO99/41310. The polymerization catalysts used in the ethylene copolymerization may be any Ziegler Natta catalysts capable of producing a polyethylene with the desired molecular weight profile, in heterogeneous or supported form. Ziegler Natta catalysts capable of appropriate ethylene polymerization are well known and are described for example in EP-A-443374.

Where the copolymer mixture is produced as a bimodal polymer in a two-stage polymerization, the initial stage product preferably has a low molecular weight with a density of at least 945 kg/m³ (e.g. 945 to 960 kg/m³), preferably at least 955 kg/m³ and an $MFR_{2.16}$ (190° C.) of at least 100 g/10 min (e.g. 110 to 3000 g/10 min) and the bimodal product preferably has a density of 918 to 935 kg/m³ (e.g. 920 to 930 kg/m³), a $MFR_{2.16}$ (190° C.) of 0.1 to 0.9 g/10 min (e.g. 0.15-0.6 g/10 min), a weight average molecular weight (Mw) of at least 100 KD, preferably 150000 to 300000 D or at least 226000 D, (preferably 200000 to 280000D, more preferably 230000 to 270000D), and a MWD of 10 to 35 (preferably 15 to 25).

Such a copolymer mixture may particularly conveniently be produced according to the technique described in WO 99/41310 using a slurry loop reactor followed by a gas phase reactor and with a density of 923 kg/m³, weight average molecular weight (Mw) of 240000D, $MFR_{2.16}$ (190° C.) of 0.2 g/10 min, and an MWD of 22.

In such a two-stage polymerization process, the comonomer used is preferably a $C_{3-12}$ alpha olefin or a mixture of two or more $C_{3-12}$ alpha olefins, e.g. 1-butene, 1-pentene, 1-hexene, 4-methyl-1-pentene, 1-heptene, 1-octene, 1-nonene and 1-decene, with 1-butene and 1-hexene being preferred. Hence, the term "copolymer" as used herein is intended to cover terpolymers as well. A preferred terpolymer of use in the invention is an ethylene/butene/hexene terpolymer.

In a highly preferred embodiment the copolymer is bimodal and hence comprises two copolymer fractions which are both ethylene/butene copolymers. By using butene as the comonomer, as opposed to hexene, economic savings can be achieved. The comonomer incorporation is 2 to 10% mole relative to ethylene, especially 4 to 8% mole.

For film formation using a polymer mixture it is important that the different components be intimately mixed prior to extrusion and blowing of the film as otherwise there is a risk of inhomogeneities, e.g. gels, appearing in the film. Thus it is especially preferred to thoroughly blend the components, for example using a twin screw extruder, preferably a counterrotating extruder.

Examples of further polymer materials which may be incorporated into the copolymer mixture layer in the shrink films of the invention include ethylene homo- and co-polymers, and high pressure (HP) copolymers (e.g. ethyl butyl acrylate (EBA), ethyl methacrylate (EMA), and ethyl vinyl acetate (EVA) copolymers). Typically these may be included as up to about 40% wt of the copolymer mixture layer, more generally up to about 25% wt, e.g. 18 to 22% wt.

The inclusion of polymers such as LDPE, EMA, EVA, and EBA may be used to balance the shrinkage behaviour of the shrink film in the machine direction (MD) and the transverse direction (TD). Of these, the HP copolymers such as EMA, EVA and EBA are preferred as elasticity may be improved and impact strength may be maintained or improved.

The shrink films of the invention may advantageously be multi-layer films, e.g. laminates or coextruded multi-layer films. These multi-layer films may be produced by conventional techniques. The layers (other than the MWD 10-35 ethylene copolymer mixture layer) may for example comprise LDPE, Ziegler Natta LLDPE, metallocene LLDPE, ethylene copolymers, polypropylene, and fabric. External polypropylene and fabric layers may be used to prevent fusion to or damage to the items being packaged by the shrink film. External layers of other polyethylenes, e.g. as mentioned above, are particularly preferred when high gloss and/or low haze is desired.

The shrink film of the invention will typically be produced by extrusion through an annular die, blowing into a tubular film by forming a bubble which is collapsed between nip rollers after solidification. This film can then be slit, cut or converted (e.g. gusseted) as desired. Conventional shrink film production techniques may be used in this regard. Typically the copolymer mixture layer will be extruded through a die at a temperature in the range 170° C. to 250° C., and cooled by blowing gas (generally air) at a temperature of 10 to 50° C. to provide a frost line height of 2 to 8 times the diameter of the die. To obtain balanced shrink properties, the blow up ratio should generally be relatively high, e.g. in the range 2 to 5. Moreover, the polymer will be drawn down, by setting an appropriate difference between the rate of the winder taking up the film and the polymer flow rate, so as to achieve the desired film thickness and longitudinal orientation.

The LLDPE layers in the shrink films of the invention typically (for a 115 μm thick film) may exhibit impact resistances, determined as dart drop values, of at least 800 g/50%, preferably 900 to 1500 g/50%, and shrinkage in the MD (at 135° C.) of up to 70%, e.g. 40 to 70% and in the TD of up to 45%, e.g. 20 to 40%.

Moreover, it is preferable if the value of dart drop (in g)/film thickness (in μm) is 5 or more, preferably 5.5 or more, especially 6 or more.

The dart drop values of the shrink films of the invention are outstanding and never before have such high Dart Drop values been observed in shrink films. Thus, viewed from a still further aspect the invention provides a polyolefin shrink film, e.g. polyethylene shrink film having a Dart drop value (g)/film thickness (μm) of 5 or more, preferably 5.5 or more, especially 6 or more. Hence, Film 6 in the examples has a Dart drop value (g)/film thickness (μm) of 260/40=6.5 g/μm.

The shrink film in this embodiment should preferably comprise an ethylene copolymer/copolymer mixture, particularly one in which its molecular weight distribution is in the range 10 to 35, and its weight average molecular weight is at least 100 kD. Such a shrink film is preferably unilamellar.

The shrink films of the invention may of course be used to wrap or encase items, e.g. books, magazines, bottles, etc and this forms a further aspect of the invention.

Viewed from a further aspect therefore the invention provides a process for wrapping an object comprising applying a shrink film about said object and shrinking said film by the application of heat thereto, characterized in that said film is a shrink film according to the invention.

Viewed from a further aspect the invention provides an object shrink wrapped with a shrink film according to the invention.

The shrink films of the invention are distinguished from prior art shrink films in their special combination of improved mechanical and shrink properties. The high density low molecular weight copolymer will have a higher crystallization temperature and, during the shrinking process, will crystallize more rapidly than the lower density higher molecular weight copolymer. Thus during the film forming process a high degree of polymer chain entanglement will occur leading to increased toughness in the shrink film and to a highly oriented structure which provides improved shrinkage properties. Thus the films of the invention exhibit the following advantageous properties: low melt stress (low hot shrink force) reducing hole formation during shrinkage; high cold shrink force, leading to better holding by the shrunk film of objects packaged by it; improved mechanical properties for the shrink film, allowing more demanding (e.g. sharp edged) products to be shrink wrapped and/or allowing thinner films to be used (and hence allowing the amount of polymer wrapping to be reduced); and a matt surface. The matt surface of the film provides a non-blocking low friction surface without needing the use of additives to achieve such properties and makes it easier to handle the film and to open it during the film feeding step of shrink wrapping. The film is thus easier to use in automated processes.

The invention will now be described further with reference to the following non-limiting Examples.

Various terms and properties referred to herein are defined or determined as follows:

Molecular Weight Distribution (MWD): This is defined as Mw/Mn where Mw is the weight average molecular weight (in Daltons) and Mn is the number average molecular weight (in Daltons). These are determined by gel permeation chromatography.

$MFR_{2.16}$ and $MFR_{21.6}$ are melt flow rates determined at 190° C. according to ISO 1133.

Density is determined according to ISO 1183. Tensile Strength ISO 527-3.

Shrinkage is measured in both Machine (MD) and Transverse (TD) directions in the following way. Specimens of 10 mm width and 50 mm length (Li) are cut out from the film sample in both MD and TD. The samples are placed on a preheated talcum bed and exposed at 160° C. in a heated oven with circulating air for 2 minutes. After the heat exposure, the residual length (Ls) of the samples is measured.

Calculation of the Shrinkage in MD (Machine Direction/%)

$$\frac{L_i MD - L_s MD \times 100}{L_i MD}$$

Calculation of the Shrinkage in TD (Transverse Direction/%)

$$\frac{L_i TD - L_s TD \times 100}{L_i TD}$$

Of which: $L_i$MD=initial machine direction specimen length.
$L_s$MD=machine direction specimen length after shrinkage.
$L_i$TD=initial transverse direction specimen length.
$L_s$TD=transverse direction specimen length after shrinkage.

Impact Resistance (Determined on Dart-drop (g/50%))

Dart-drop is measured using ISO 7765-1, method "A". A dart with a 38 mm diameter hemispherical head is dropped from a height of 0.66 m onto a film clamped over a hole. If the specimen fails, the weight of the dart is reduced and if it does not fail the weight is increased. At least 20 specimens are tested. The weight resulting in failure of 50% of the specimens is calculated.

Tear Resistance (Determined as Elmendorf Tear (N))

The tear strength is measured using the ISO 6383 method. The force required to propagate tearing across a film specimen is measured using a pendulum device. The pendulum swings under gravity through an arc, tearing the specimen from pre-cut slit. The specimen is fixed on one side by the pendulum and on the other side by a stationary clamp. The tear strength is the force required to tear the specimen.

Film Thickness Profile (2-Sigma/%)

In the laboratory the film thickness profile is measured by a non-touchable (capacitive) measuring (sensor) system from Octagon Process Technology. From this measurement one can also get average thickness, min./max. thickness, standard deviation and calculated tolerances expressed as 2-Sigma.

EXAMPLE 1

Shrink Films

Four monolayer shrink films of 130 µm thickness were prepared by blown film extrusion using a conventional film extruder with a die having a diameter of 200 mm and a die gap of 1.0 mm. Film blowing took place at an extrusion temperature of 200° C., a blow up ratio (BUR) of 1:3 and a frost line height (FLH) of 900 mm.

Film 1 was produced from two polymers blended in the single screw extruder of the film blowing line. 90% wt was an LDPE (FA 3220 available from Borealis A/S, Lyngby, Denmark) of $MFR_{2.16}$ (190° C.) 0.3 g/10 min and density 923 kg/m$^3$ and 10% wt was HDPE (FL3450 available from Borealis A/S) of $MFR_{2.16}$ (190° C.) 0.4 g/10 min and density 945 kg/m$^3$.

Film 2 was also produced from two polymers blended in the single screw extruder of the film blowing line. 80% wt was a high MWD LLDPE produced using the technique of WO99/41310 using a slurry loop reactor followed by a gas phase reactor, comonomer butene, with a density of 923 kg/m$^3$, Mw of 240 kD, $MFR_{2.16}$ (190° C.) of 0.2 g/10 min, $MFR_{2.16}$ (190° C.) 22 g/10 min and MWD of 22 (59% wt of this was a low Mw ethylene copolymer of $MFR_{2.16}$ (190° C.) 300 g/10 min and density 950 kg/m$^3$ and 41% was a high Mw ethylene copolymer of $MFR_{2.16}$ (190° C.) <3 g/10 min and density <905 kg/m$^3$). The remaining 20% wt of the blend in Film 2 was an ethylmethacrylate polymer (EMA) having $MFR_{2.16}$ (190° C.) 0.4 g/10 min and a methylacrylate content of 25% wt. Film 3 was similar to Film 2 except the EMA had $MFR_{2.16}$ (190° C.) 2 g/10 min and a methacrylate content of 18% wt. Film 4 was produced from the high MWD LLDPE used for the production of films 2 and 3.

Shrinkage in MD and TD, impact resistance and tear resistance were measured as described above. The results are set out in Table 1 below.

TABLE 1

| Film | Shrinkage (TD) % | Shrinkage (MD) % | Tear Resistance (MD/TD) | Dart Drop (g/50%) |
|---|---|---|---|---|
| 1* | 36 | 74 | 3.2/6.6 | 475 |
| 2 | 34 | 66 | 17/21 | 1200 |
| 3 | 28 | 64 | 19/24 | 1145 |
| 4 | 26 | 62 | 18/21 | 1005 |

*comparative

In comparison the shrink films produced from ethylene copolymer mixtures produced by the twin gas phase reactor two stage polymerization described in U.S. Pat. No. 5,736,258/EP-A-773257 showed significantly lower dart drop values. These results are shown below.

EXAMPLE 2

Three monolayer (or unilamellar) shrink films of 40 µm thickness were prepared by blown film extrusion using conventional film extruder with a die having diameter of 200 mm and a die gap of 1.0 mm. Film blowing took place at an extrusion temperature of 200° C., a blow up ratio (BUR) of 1:2.5 and frost line height of 450 mm at a production rate of 120 kg/hr. Film 5 was produced from a commercial grade EZP2207 which has been available in Europe from Union Carbide. This product is a bimodal LLDPE from UCC produced in dual gas phase process in accordance with example A of EP0773257 with the properties specified in table 2. Film 6 was produced from high MWD LLDPE according to this invention, under the commercial name FB2230. Film 7 was produced from a commercially available LDPE (FT5232) and which is frequently used for shrink films.

TABLE 2

| | 40 μm films | | |
|---|---|---|---|
| | Film 5 | Film 6 | Film 7 |
| MRF2 | 0.76 | 0.25 | 0.6 |
| density | 922.5 | 922.4 | 922 |
| dart drop (g) | 128 | 260 | 120 |
| Tear MD N | 4.7 | 4 | 4 |
| Tear TD N | 16.7 | 13.9 | 2 |
| Tensile str MD (MPa) | 54 | 54 | 27 |
| Tensile Str TD (MPa) | 32 | 36 | 24 |

As is clear for films of the same density, Dart drop values exhibited by Film 2 (of the invention) are much better than those of conventional shrink films such as films 1 and 3.

The invention claimed is:

1. A shrink film comprising a polyethylene film, comprising an ethylene copolymer mixture having a molecular weight distribution in the range 10 to 35, a density of 915 to 940 kg/m$^3$, a weight average molecular weight of at least 100000 D and an MFR$_{2.16}$ (190° C.) of 0.1 to 0.9 g/10 min, which copolymer mixture is produced by a two or more stage copolymerization of ethylene and 2 to 10% mole (relative to ethylene) of a C$_{3-12}$ alpha-olefin comonomer in a series of reactors including at least one slurry loop reactor and at least one gas phase reactor using a heterogeneous Ziegler-Natta catalyst; wherein the copolymer mixture is bimodal and comprises a lower molecular weight component and a higher molecular weight component; and wherein the lower molecular weight component has an MFR$_2$ of at least 100 g/10 min and a density of from 945 kg/m$^3$ to 960 kg/m$^3$.

2. A shrink film as claimed in claim 1 wherein the molecular weight of the copolymer is 150000 to 300000 D.

3. A shrink film as claimed in claim 1 wherein the molecular weight of the copolymer is at least 226,000 D.

4. A shrink film as claimed in claim 1 wherein the MWD of the copolymer is between 15 and 23.

5. A shrink film as claimed in claim 1 wherein said copolymer comprises a lower molecular weight component and a higher molecular weight component both formed from an ethylene/butene copolymer.

6. A shrink film as claimed in claim 1 wherein the MFR$_2$ of the copolymer is 0.15 to 0.6 g/10 min.

7. A shrink film as claimed in claim 1 wherein the value of a films' dart drop (g)/thickness (μm) is at least 4.5.

8. A shrink film as claimed in claim 1 wherein said film has a thickness of 20 to 120 μm.

9. A shrink film as claimed in claim 1 wherein said shrink film is a multilayer film.

10. A shrink film as claimed in claim 1 wherein said shrink film is unilamellar.

11. A shrink film as claimed in claim 10 having a thickness of 100 to 200 μm.

12. A process for wrapping an object comprising applying a shrink film about said object and shrinking said film by the application of heat thereto, characterized in that said film is a shrink film according to claim 1.

13. An object shrink wrapped with a shrink film according to claim 1.

14. A polyolefin shrink film as claimed in claim 1 having a Dart drop value (g)/film thickness (μm) of 5 g/μm or more.

15. The shrink film of claim 14 wherein Dart drop value (g)/film thickness (μm) is 6 g/μm or more.

* * * * *